US008925064B1

(12) United States Patent
Bressler

(10) Patent No.: US 8,925,064 B1
(45) Date of Patent: Dec. 30, 2014

(54) COVERT HIGH ASSURANCE PERSONAL COMPUTER WITH LOCAL NETWORK (CHAPLN)

(75) Inventor: William Dennis Bressler, Lansdale, PA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 412 days.

(21) Appl. No.: 13/535,488

(22) Filed: Jun. 28, 2012

(51) Int. Cl.
*H04L 29/06* (2006.01)
(52) U.S. Cl.
CPC .......... *H04L 63/105* (2013.01); *H04L 29/0685* (2013.01)
USPC ................................. 726/11; 726/4
(58) Field of Classification Search
CPC ........................... H04L 63/105; H04L 29/0685
USPC ........................................................ 726/4, 11
See application file for complete search history.

(56) References Cited

U.S. PATENT DOCUMENTS

| 6,922,774 | B2 | 7/2005 | Meushaw |
| 7,490,347 | B1 * | 2/2009 | Schneider et al. ................. 726/2 |
| 7,506,170 | B2 | 3/2009 | Finnegan |

OTHER PUBLICATIONS

Hewlett Packard NETTOP Brochure; available on the internet at h71028.www7.hp.com/enterprise/downloads/HP%20NetTop-Brochure.pdf; accessed on May 1, 2012.

* cited by examiner

*Primary Examiner* — Jeffrey Pwu
*Assistant Examiner* — Thong Truong
(74) *Attorney, Agent, or Firm* — SPAWAR Systems Center Pacific; Kyle Eppele; J. Eric Anderson

(57) ABSTRACT

A computer comprising: a first virtual machine (VM1) that is minimally configured to host a first firewall, a first network address translator (NAT), and a network interface card (NIC) which is operatively connected a low domain wide area network (WAN); a first virtual switch (VSW1) operatively coupled to the VM1; a second virtual machine (VM2) operatively coupled to the VSW1, wherein the VM2 is configured to process all low domain information; a third virtual machine (VM3) operatively coupled to the VSW1, wherein the VM3 is minimally configured to host a second firewall and a second NAT; a second virtual switch (VSW2) operatively coupled to the VM3; and a fourth virtual machine (VM4) operatively coupled to the VSW2, wherein the VM4 is configured to process all high domain information, such that the computer can operate in both high and low security levels and connect to the WAN with a single NIC.

19 Claims, 7 Drawing Sheets

COVERT HIGH ASSURANCE PERSONAL COMPUTER WITH LOCAL NETWORK (CHAPLN)

FEDERALLY-SPONSORED RESEARCH AND DEVELOPMENT

This invention is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; ssc_pac_t2@navy.mil. Reference Navy Case Number 101171.

BACKGROUND OF THE INVENTION

Many institutions have an ever increasing requirement to process data at more than one security level. A given task may start at a lower security domain and then be completed at a higher security domain in a separate high security area. The ability to work in the high domain and to access a low domain network from the same workstation is highly desirable. Often the high domain physical spaces are small in size so reducing the hardware footprint is desirable.

FIG. 1 shows a typical configuration of a first prior art system 10 that provides access to two security domains. FIG. 1 shows a high domain computer 12 and a low domain computer 14, both connected to a low domain network 16. High domain data is passed through the low domain network to a high domain server 18 using a Virtual Private Network (VPN) tunnel 20. There is no connectivity between the high and low domain computers 14 and 16; connectivity between the domains, if required, requires a cross domain solution (CDS). The low domain computer 14 is connected to a low domain server 22 via the low domain network 16.

FIG. 2 illustrates a second prior art system 24 that provides access to two security domains. The system shown in FIG. 2 reduces size, weight, and power parameters when compared to the first system 10 of FIG. 1, but still requires two network interface cards (NICs). Prior art system 24 utilizes a single computer 26 equipped with two virtual machines, one for the high domain and one for the low domain. Each virtual machine has its own NIC. In these prior art system architectures multiple low domain computers can be simply added, but there is no way to simply add additional high domain computers without requiring each additional high domain computer to have its own VPN connection.

SUMMARY

Disclosed herein is a single computer configured to support both a high domain security level and a low domain security level. The computer comprises first, second, third, and fourth virtual machines ($VM_1$, $VM_2$, $VM_3$, and $VM_4$ respectively) and first and second virtual switches ($VSW_1$ and $VSW_2$ respectively). The VM1 is minimally configured to host a first firewall, a first network address translator (NAT), and a first network interface card (NIC) which is operatively connected a low domain wide area network. The VSW1 is operatively coupled to the VM1. The VM2 is operatively coupled to the VSW1, and the VM2 is configured to process all low domain information. The VM3 is operatively coupled to the VSW1. The VM3 is minimally configured to host a second firewall and a second NAT. The VSW2 is operatively coupled to the VM3. The VM4 is operatively coupled to the VSW2. The VM4 is also configured to process all high domain information, such that the computer can operate in both the high and low domain security levels and connect to the low domain wide area network with a single NIC.

Also disclosed herein is another embodiment of the computer configured to support both a high domain security level and a low domain security level. In this embodiment, the computer comprises a processor configured to run an operating system (OS) that has a software architecture capable of executing at least four isolated OSs, each isolated OS corresponding to either the high domain or the low domain. The processor also comprises a first virtual machine (VM) configured to interface with a low domain wide area network (WAN) through a first network interface card (NIC). The first VM hosts a software firewall and network address translator (NAT), which is configured to block all unsolicited traffic to the computer. The processor also comprises a second VM connected to the first VM via a virtual local area network (VLAN). The second VM is configured to allow operator access to the low domain network. The processor also comprises a third VM connected to the VLAN, wherein the third VM is configured to operate as a second NAT, which is configured to provide a high domain LAN and a virtual private network (VPN) tunnel endpoint. The processor also comprises a fourth VM, which is configured to access the high domain connected to the high domain via the high domain LAN through the third VM's VPN tunnel through the first VM's NIC to the low domain (WAN).

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

Figure 1:
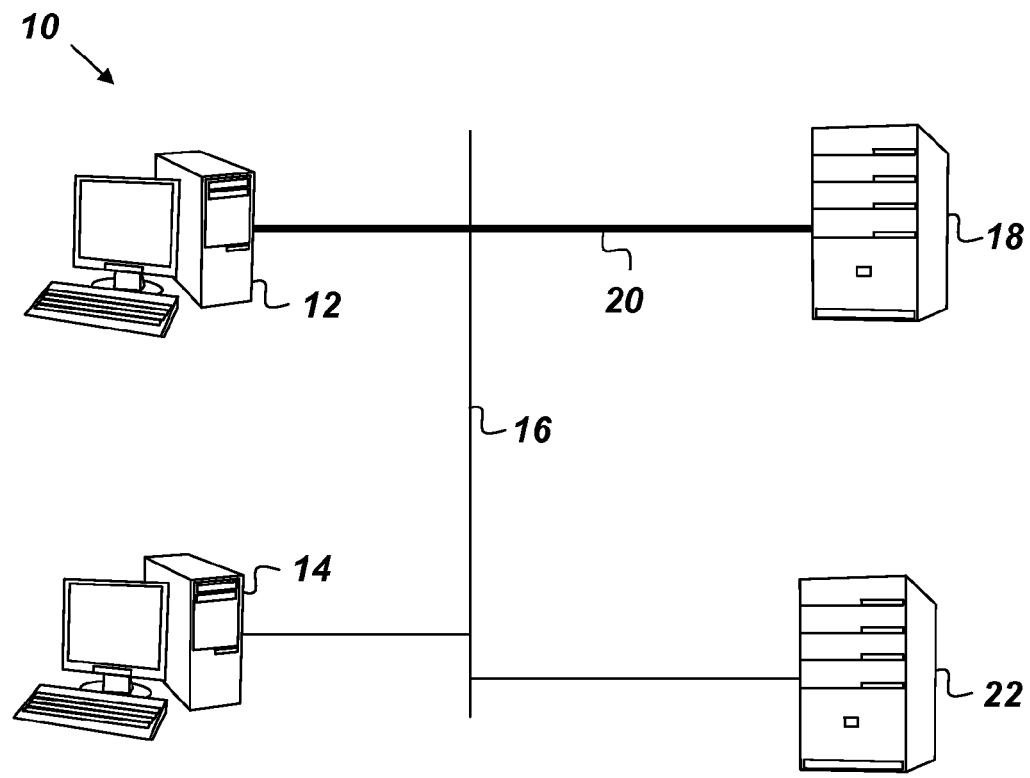
FIG. 1 is an illustration of a two-domain prior art system.
Figure 2:
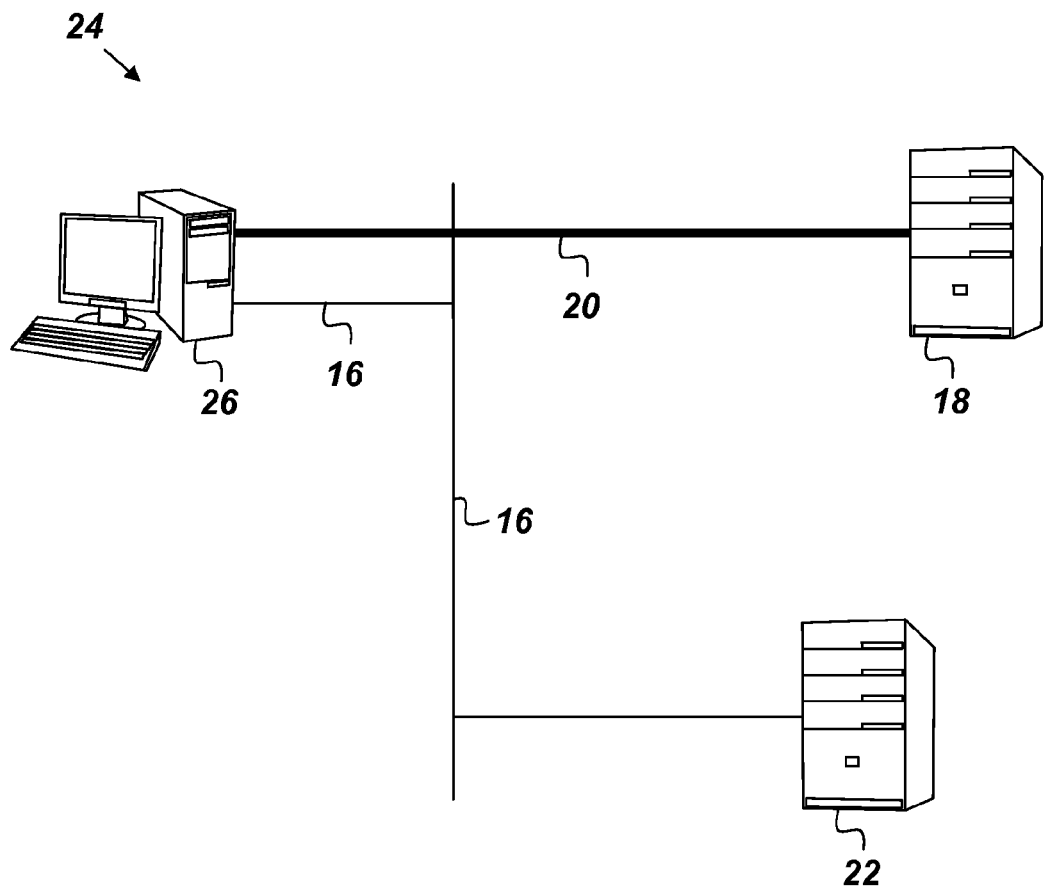
FIG. 2 is an illustration of another two-domain prior art system.
Figure 3:
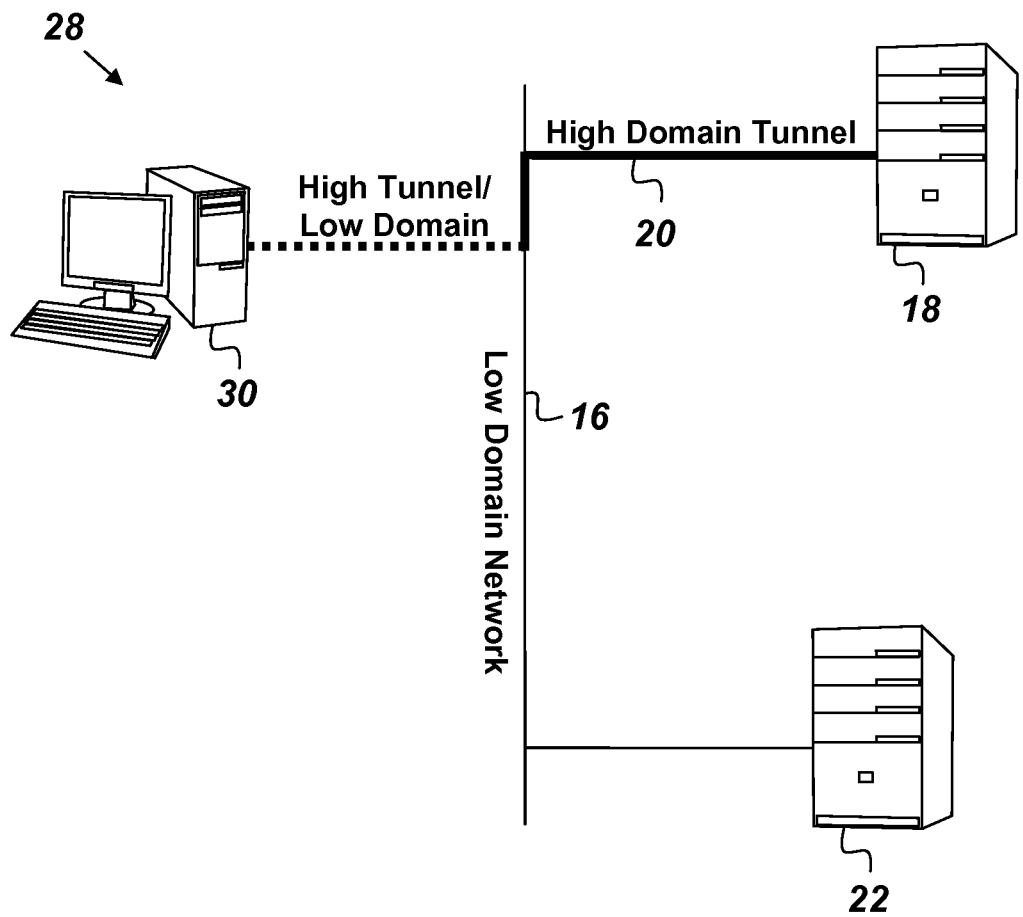
FIG. 3 is an illustration of an improved two-domain system.

FIG. 3 is an illustration of a novel dual domain system 28 with a single computer 30 that is configured to support both a high domain security level and a low domain security level and isolates both domains from the low domain wide area network 16. In the dual domain system 28, both the high domain tunnel 20, which connects to the high domain server 18, and the low domain wide area network 16 connect to the computer 30 via a common network interface card (NIC), shown in FIG. 4 and discussed below.

Figure 4:
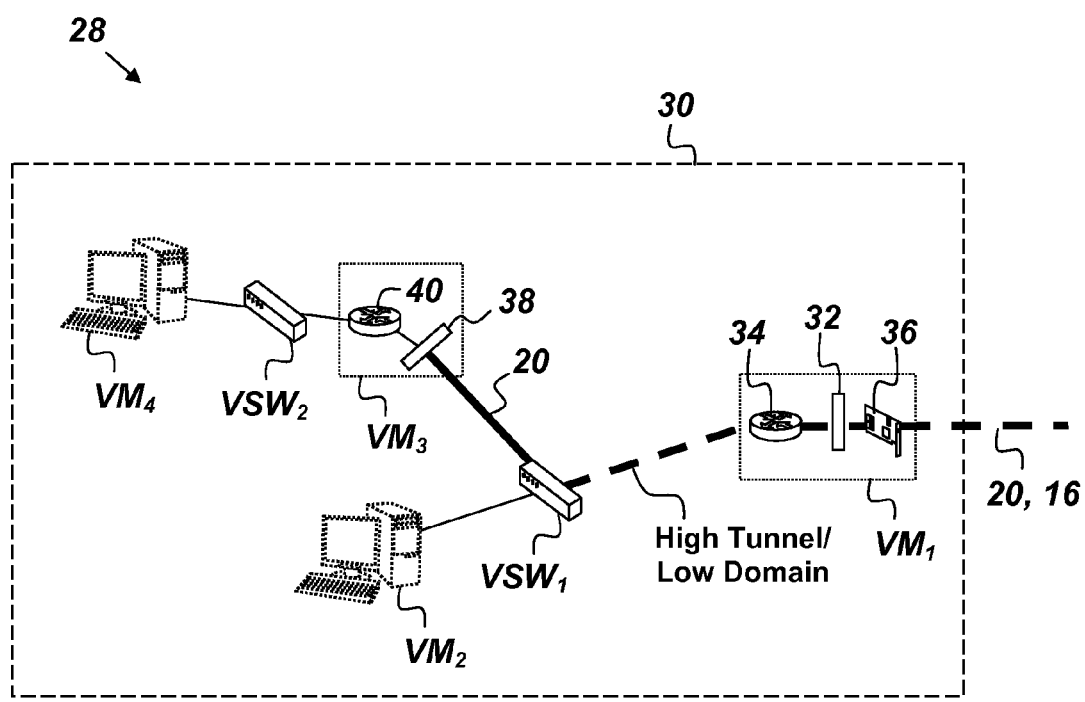
FIG. 4 is an illustration of the design architecture of two-domain system shown in FIG. 3.

FIG. 4 is an illustration of the architecture of the dual domain system 28. As shown, the computer 30 comprises first, second, third, and fourth virtual machines ($VM_1$, $VM_2$, $VM_3$, and $VM_4$ respectively) and first and second virtual switches ($VSW_1$ and $VSW_2$ respectively). $VM_1$ is minimally configured to host a first firewall 32, a first network address translator (NAT) 34, and a first NIC 36, which is operatively connected to the low domain wide area network 16. VSW$_1$ is operatively coupled to the VM$_1$. VM$_2$ is operatively coupled to VSW$_1$. VM$_2$ is configured to process all low domain information. VM$_3$ is operatively coupled to VSW$_1$ and is minimally configured to host a second firewall 38 and a second NAT 40. As shown, VSW$_2$ is operatively coupled to VM$_3$. VM$_4$ is operatively coupled to VSW$_2$ and is configured to process all high domain information, such that the computer can operate in both the high and low domain security levels and connect to the low domain wide area network 16 with a single NIC.

The dual domain system 28 may utilize any system architecture designed to provide secure access to multiple security domains from a single machine by using virtual machine technology. A suitable example of a software platform or system architecture that may serve as the basis for the dual domain system 28 includes, but is not limited to Hewlett Packard's® NetTop™ software. In the NetTop™ architecture, for example, multiple virtual machines each run a standard commercial operating system (OS) on top of a host OS with some additional security changes added to support a mandatory access control model. A suitable example of a host OS of the dual domain system 28 is a security-enhanced Linux® OS based on the VMWare® virtual machine monitor. The dual domain system 28 may employ a secure Linux® host OS with virtual machine capability to address network isolation for the applications that reside in the virtual machines.

Figure 5:
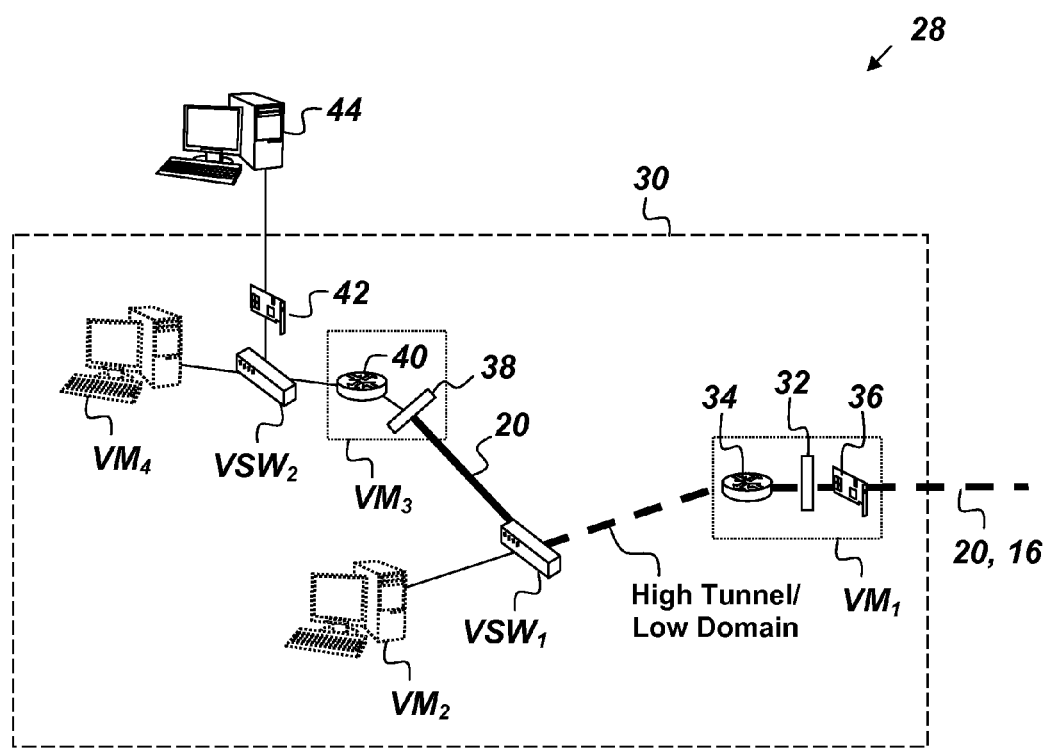
FIG. 5 is an illustration of the design architecture of another embodiment of the two-domain system.

FIG. 5 is an illustration of another embodiment of the dual domain system 28. As discussed above, the dual domain system 28 reduces network connectivity to one NIC. Both the high domain tunnel and the low domain connectivity utilize a common NIC (i.e., the first NIC 36). An additional, unaddressed deficiency in prior art architectures is that while multiple low domain computers can be simply added, there is no way to simply add additional high domain computers. In the prior art, additional high domain computers incur additional complexity by requiring each to have its own VPN connection. The embodiment of the dual domain system 28 shown in FIG. 5 solves this deficiency by the optional addition of a high local area network (LAN) second NIC 42 which allows one or more additional high domain computers 44 to share the dual domain system 28 high domain tunnel. Thus each additional high domain computer 44 does not require its own VPN tunnel preventing additional setup and maintenance of the VPN connections.

As mentioned above, VM$_1$ comprises the first firewall 32, the first NAT 34, and the first NIC 36. The first NAT 34 hides the true architecture of the dual domain system 28 from other users of the low domain network 16. In other words, the design of the dual domain system 28 has a covert nature in that the internal architecture is hidden behind the first firewall 32 and the first NAT 34 to provide a layered approach to security. During a network scan of the computer 30 from outside the system, the dual domain system 28 would look like a router appliance; the scan could not penetrate past the first NAT 34 since the dual domain system 28 uses private internet protocol (IP) addresses on the internal domains which cannot be scanned from the public network 16. Also, while the high internal domain can see the low internal domain the low cannot see the high internal domain. Thus, the dual domain system 28 provides an added layer of security by masking the true architecture of the dual domain system 28 to outside users. VM$_1$ hosts the hardware first NIC 36 to the low domain network 16 and adds the covert architecture. VM$_1$ can use any operating system that can be minimally configured to provide just NIC, NAT, and firewall capabilities. For example the VM$_1$ may be configured to use a security-enhanced Linux® OS that is minimally configured. The minimal services required to host a firewall and NAT are all that is configured, which greatly reduces the VM$_1$ vulnerabilities. VM$_1$ provides the covert piece of the dual domain system 28. To the low domain network 16, the dual domain system 28 appears as a firewall appliance, masking the true functionality behind it. All the traffic passes through or is blocked by VM$_1$.

VSW$_1$ provides the switching function for a virtual LAN (VLAN). Both the high domain tunnel traffic and the low domain traffic are handled by VSW$_1$. VM$_2$ functions as a low domain PC. All traffic to/from VM$_2$ passes through VM$_1$. VM$_2$ does not have access to the Virtual high LAN behind the second NAT 40. VM$_2$ can utilize any OS. Suitable examples of an OS that may be utilized by VM$_2$ include, but are not limited Microsoft® Windows®, Android®, BSD, iOS, GNU/Linux, Mac OS X, and IBM z/OS. VM$_2$ has normal access to the low domain network, although all traffic must be initiated by VM$_2$. Unsolicited traffic destined for VM$_2$ is blocked by VM$_1$.

VM$_3$ is the high domain tunnel endpoint and employs the second NAT 40 to block access from the low domain VM$_2$. VM$_3$, like VM$_1$ may use any locked-down version of an OS such that non-essential services are turned off. A suitable example of the OS for VM$_3$ is Microsoft® Windows XP® or newer. VM$_3$ may act as a router appliance similar to the way VM$_1$ functions. To create the high domain VLAN, VM$_3$ is configured to share its network connection to VSW$_1$, which automatically creates a NAT in Windows. All high domain traffic is configured to pass through the tunnel; the routing of VM$_3$ is restricted to only the tunnel endpoint. VM$_4$ functions as the high domain computer which only has access to the HDVLAN and the high domain VPN tunnel. All traffic to/from VM$_4$ passes through VM$_3$ so all the traffic is protected by encryption. The minimal VPN encryption standard is Advanced Encryption Standard (AES) 256.

Referring back to the embodiment of the dual domain system 28 depicted in FIG. 5, the VSW$_2$ performs the switching function for the high domain VLAN (HDVLAN). The second hardware NIC 42 also is connected to the HDVLAN. The second NIC 42 is a one, two, or four port NIC and allows the additional high domain computer 44 to share the dual domain system 28 tunnel to a high domain network or server 18. Thus, there is only one VPN tunnel to maintain. The second hardware NIC 42 affords additional high domain computers 44, printers, and network addressable storage (NAS) access to the HDVLAN. The HDLAN allows additional high domain computers 44 access to the high domain VPN tunnel without requiring each high domain computer 44 to configure individual VPN tunnels. The only requirements are that each additional high domain computer 44 satisfy the security requirements for the high domain and have Dynamic Host Control Protocol (DHCP) enabled.

Figure 6:
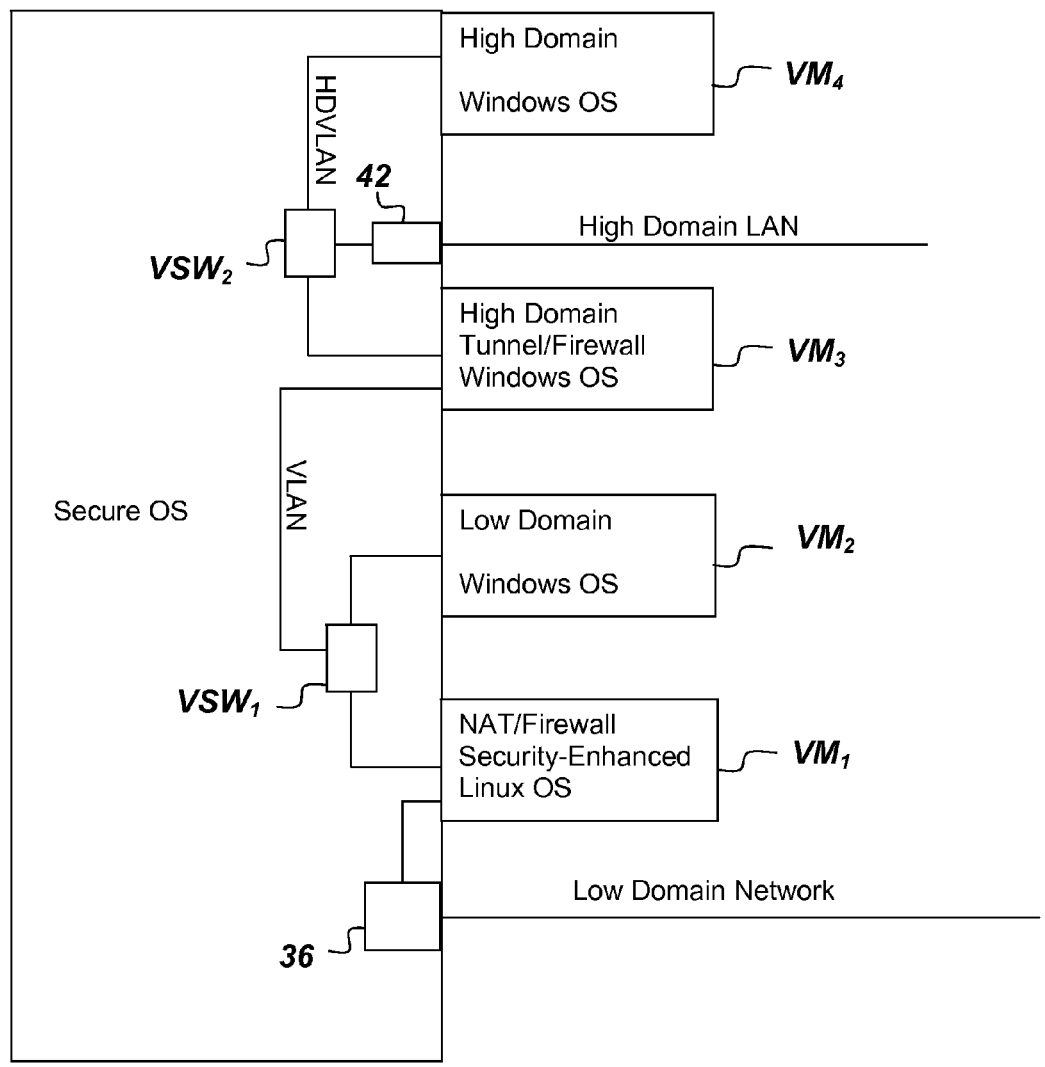
FIG. 6 is an illustration of the virtual machine design architecture of an embodiment of the two-domain system shown in FIG. 5.

FIG. 6 depicts an example virtual machine architecture for the dual domain system 28 that illustrates a network topology that can support two security domains. In this embodiment, the secure host OS is NetTop™ which hosts four virtual machines (VM$_1$, VM$_2$, VM$_3$, and VM$_4$). Each VM is independent from each other and the security separation is maintained in this embodiment by the underlying security-enhanced Linux® which has been secured by the security policy. NetTop™ hosts the VMs and their configuration. The host OS (i.e., NetTop™ in this embodiment) does not interact with the individual OSes or applications that run within the VMs. The host OS also hosts the virtual network devices such as the virtual switches and virtual LANs. The virtualized architecture in FIG. 6 is identical to the dual domain system 28 architecture in FIG. 5 with the exception that the embodiment shown in FIG. 6 is using virtualized hardware, not individual hardware and FIG. 6 is attempting to show the design of the dual domain system 28 from an OS point of view; that is the OS is only concerned about the VMs and how they interconnect. The OS has no knowledge of what is going on inside the VMs only how they are connected together. The host computer may be hardware similar to computer hardware found in most homes. The difference is that the dual domain system 28 would require upgraded specifications like a minimum of a quad-core processor and 16 GB of RAM for performance.

The dual domain system 28 may be configured to utilize encrypted hard drives (HDD) with unique encryption for the high/low domains and the host OS. The encryption can be provided in a number of ways but the preferred way is through hardware encryption. Unique username/password requirements may be implemented to manage access to the high domain functions. The dual domain system 28 may be designed to be used in a high security environment such that the primary user is a high domain user and low domain functionality is provided to give the high domain user access to the low domain if required. CD/DVD access may be restricted to the low domain and host OS only. For example, NetTop™ requires a method to offload the log files and for software installation. The high domain users may be denied access to CD/DVD functions. A high domain printer can be installed on HDLAN for use by the high domain only. The low domain has access to the low domain network for printer access. A single monitor, keyboard, mouse is shared by both domains resulting in savings in size, weight, and power requirements. The dual domain system 28 can be configured on any sized computer 30, including desktops, laptops, handheld devices, etc.

Figure 7:
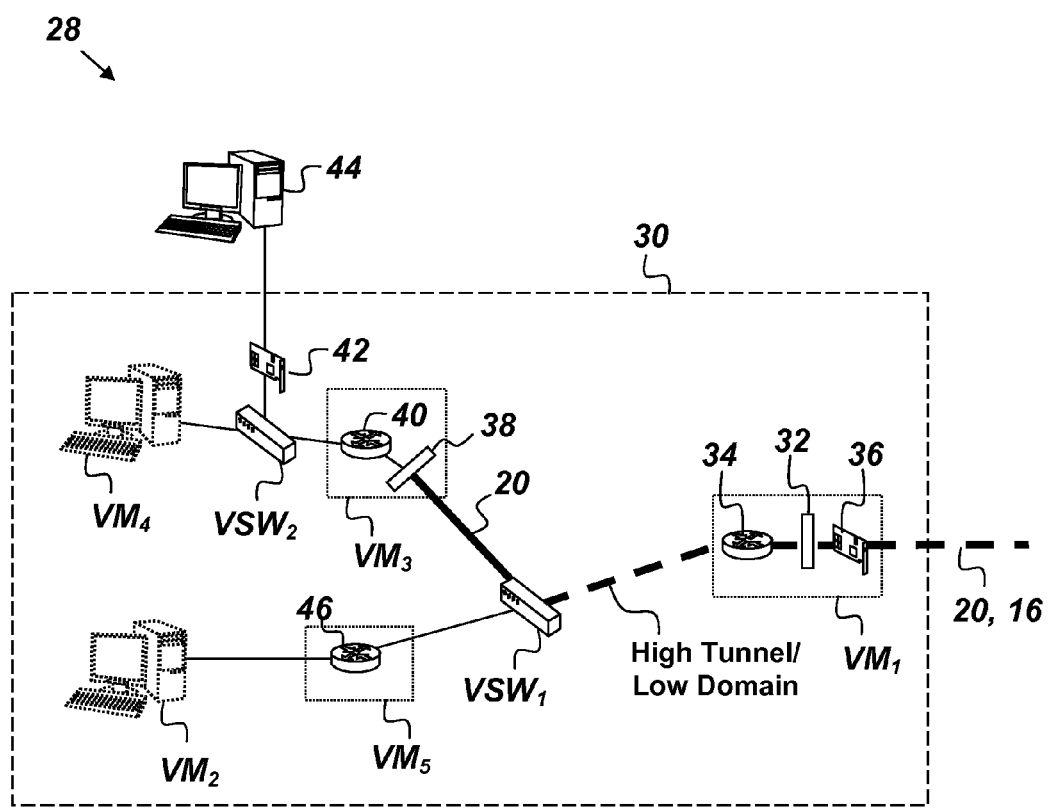
FIG. 7 is an illustration of the design architecture of another embodiment of the two-domain system.

FIG. 7 is an illustration of another embodiment of the dual domain system 28 further comprising a fifth virtual machine $VM_5$ coupled between $VSW_1$ and $VM_2$. $VM_5$ comprises a third NAT 46, which functions as a low domain NAT for additional protection.

From the above description of the dual domain system 28, it is manifest that various techniques may be used for implementing the concepts of the dual domain system 28 without departing from its scope. The described embodiments are to be considered in all respects as illustrative and not restrictive. It should also be understood that dual domain system 28 is not limited to the particular embodiments described herein, but is capable of many embodiments without departing from the scope of the claims.

I claim:

1. A single system configured to support both a high domain security level and a low domain security level, the system comprising:
    a computer comprising:
        a first virtual machine (VM1) that is minimally configured to host a first firewall, a first network address translator (NAT), and a first network interface card (NIC) which is connected a low domain wide area network;
        a first virtual switch (VSW1) connected to the VM1;
        a second virtual machine (VM2) connected to the VSW1, wherein the VM2 is configured to process all low domain information;
        a third virtual machine (VM3) connected to the VSW1, wherein the VM3 is minimally configured to host a second firewall and a second NAT;
        a second virtual switch (VSW2) connected to the VM3; and
        a fourth virtual machine (VM4) connected to the VSW2, wherein the VM4 is configured to process all high domain information, such that the computer can operate in both the high and low domain security levels and connect to the low domain wide area network with a single NIC.

2. The computer of claim 1, wherein the computer runs a secure operating system (OS) that has a software architecture executing at least four isolated OSes, each isolated OS corresponding to either the high domain or the low domain.

3. The computer of claim 2, wherein the VM1 executes a security-enhanced OS built on a Linux kernel.

4. The computer of claim 3, wherein the VM2 executes a Windows-based OS.

5. The computer of claim 4, wherein the VM3 executes a locked-down version of a Windows-based OS.

6. The computer of claim 5, wherein the VM4 executes a Windows-based OS.

7. The computer of claim 3, wherein the VM2 executes an OS built on a Linux kernel.

8. The computer of claim 7, wherein the VM3 executes a security-enhanced OS built on a Linux kernel.

9. The computer of claim 8, wherein the VM4 executes an OS built on a Linux kernel.

10. The computer of claim 1 further comprising a second NIC connected to the VSW2 and a high domain local area network such that the VM4 may be connected to another high domain computer via a high domain local area network (LAN).

11. The computer of claim 1 wherein the high and low domains are stored on encrypted hard drives with unique encryption for the high/low domains and a host operating system.

12. The computer of claim 11, wherein the encryption of hard drives is accomplished via hardware.

13. The computer of claim 11, wherein the encryption of hard drives is accomplished via software.

14. The computer of claim 12, further comprising a CD/DVD drive which is configured to be accessed only by the VM2.

15. The computer of claim 14, further comprising a fifth VM (VM5) configured to host a third NAT, wherein the VM5 is operatively coupled between the VSW1 and the VM2.

16. The computer of claim 14, wherein the computer is a laptop computer.

17. The computer of claim 14, wherein the computer is a desktop computer.

18. A computer configured to support both a high domain security level and a low domain security level, the computer comprising:
    a processor configured to run an operating system (OS) that has a software architecture executing at least four isolated OSs, each isolated OS corresponding to either the high domain or the low domain;
    a first virtual machine (VM) configured to interface with a low domain wide area network (WAN) through a first network interface card (NIC), and wherein the first VM hosts a software firewall and network address translator (NAT) configured to block all unsolicited traffic to the computer;
    a second VM connected to the first VM via a virtual local area network (VLAN), wherein the second VM is configured to allow operator access to the low domain network;
    a third VM connected to the VLAN, wherein the third VM is configured to operate as a second NAT configured to provide a high domain LAN and a virtual private network (VPN) tunnel endpoint;

a fourth VM configured to access the high domain connected to the high domain via the high domain LAN through the third VM's VPN tunnel through the first VM's NIC to the low domain (WAN).

19. The computer of claim 18, wherein the first VM operates under a security-enhanced OS built on a Linux kernel.

* * * * *